United States Patent Office 2,980,665
Patented Apr. 18, 1961

2,980,665

PYRIMIDINES

Bernard William Langley, Alderley Park, Macclesfield, England, assignor to Imperial Chemical Industries Limited, Millbank, London, England, a corporation of Great Britain No Drawing. Filed Dec. 15, 1958, Ser. No. 780,207
Claims priority, application Great Britain Jan. 6, 1958

7 Claims. (Cl. 260—154)

This invention relates to pyrimidines and more particularly it relates to 2:6-dihydroxypyrimidines which are useful as antibacterial agents.

According to the invention we provide 2:6-dihydroxypyrimidines of the formula:

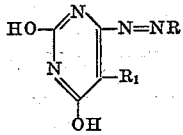

wherein R stands for an aryl radical, optionally substituted and wherein $R_1$ stands for hydrogen or for a hydrocarbon radical, optionally substituted.

As suitable values of R there may be mentioned for example a phenyl radical optionally substituted by halogen atoms such as fluorine, chlorine or bromine atoms or by lower alkyl radicals such as a methyl radical.

As suitable values of $R_1$ where $R_1$ stands for a hydrocarbon radical there may be mentioned for example the methyl radical.

According to a further feature of the invention we provide a process for the manufacture of the said 2:6-dihydroxypyrimidines which comprises oxidation of a 4-hydrazino-2:6-dihydroxypyrimidine of the formula:

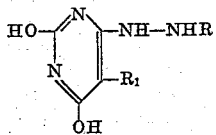

wherein R and $R_1$ have the meanings stated above, or a salt thereof.

The said oxidation process may be carried out according to any means known to the art. As suitable oxidising agents there may be mentioned for example air or oxygen, optionally in the presence of a catalyst for example a platinum oxide catalyst. Other oxidising agents may be for example ferric chloride, selenium dioxide, lead tetra-acetate, p-benzoquinone, nitrosobenzene, sodium nitrite, potassium dichromate and halogens such as bromine and iodine.

The oxidation process may conveniently be carried out in the presence of a diluent for example water, alcohol, acetic acid or aqueous pyridine. Water and aqueous pyridine are particularly convenient diluents when the said 4-hydrazino-2:6-dihydroxypyrimidine is in the form of a salt for example an alkali salt for example a sodium salt.

The 4-hydrazino-2:6-dihydroxypyrimidines used as starting material may be obtained by interaction of the corresponding 2:6-dihydroxypyrimidine containing a replaceable substituent such as a halogen atom, methylsulphonyl radical or phenylsulphonyl radical in the 4-position, and hydrazine or a salt thereof. The reaction may conveniently be carried out by heating the reactants together in an aqueous medium either in the presence of an acid-binding agent such as excess of the hydrazine component, sodium carbonate or triethylamine, or in the presence of a buffer for example sodium acetate.

As stated above, the pyrimidine derivatives of this invention possess antibacterial properties and they are particularly valuable for use as anti-bacterials in urinary infections. The said pyrimidine derivatives inhibit the growth of micro-organisms for example *Streptococcus faecalis, Streptococcus pyogenes, Streptococcus agalactiae, Streptococcus pneumoniae* and *Staphylococcus aureus*. The derivatives are effective when administered orally for example as pharmaceutical compositions in the form of powders, tablets or suspensions in liquid media and this comprises a further feature of our invention.

The invention is illustrated but not limited by the following examples in which the parts are by weight:

*Example 1*

2 parts of N-phenyl-N'-(2:6-dihydroxy-4-pyrimidyl)-hydrazine are dissolved in a solution of 2 parts of sodium hydroxide in 50 parts of water. 0.05 part of platinic oxide is added to this solution through which a stream of oxygen is passed for two hours. The mixture is then acidified and filtered and the solid residue is washed with water and with ethanol. It is crystallised from aqueous dimethylformamide and there is thus obtained 2:6-dihydroxy-4-phenylazopyrimidine as brick-red crystals of M.P. 243–244° C. with decomposition.

The N-phenyl-N'-(2:6-dihydroxy-4-pyrimidyl)-hydrazine used as starting material may be obtained as follows: A mixture of 1.46 parts of 4-chloro-2:6-dihydroxypyrimidine, 2 parts of phenylhydrazine and 100 parts of water is refluxed in an atmosphere of nitrogen for 2 hours. The crystalline deposit which forms on cooling is collected by filtration and washed with water and a little cold ethanol. There is obtained N-phenyl-N'-(2:6-dihydroxy-4-pyrimidyl)-hydrazine as pink crystals which decompose at 283–284° C.

*Example 2*

A copious stream of air is passed through a mixture of 2 parts of N-phenyl-N'-(2:6-dihydroxy-4-pyrimidyl)hydrazine, 2 parts of sodium hydroxide and 50 parts of water, at 18–22° C. for 20 hours. The mixture is then acidified and filtered and the solid residue is washed with water and with ethanol. It is then crystallised from aqueous formic acid and there is thus obtained 2:6-dihydroxy-4-phenylazopyrimidine, M.P. 243–244° C. with decomposition.

The process described above is repeated except that the N-phenyl-N'-(2:6-dihydroxy-4-pyrimidyl)hydrazine used as starting material is replaced by the equivalent proportion of N-p-fluorophenyl-N'-(2:6-dihydroxy-4-pyrimidyl)hydrazine M.P. 285–290° C. with decomposition, N-p-tolyl-N'-(2:6-dihydroxy-4-pyrimidyl)hydrazine, M.P. 277–278° C. with decomposition, N-m-tolyl-N'-(2:6-dihydroxy-4-pyrimidyl)hydrazine, M.P. 205–210° C. with decomposition or N-o-tolyl-N'-(2:6-dihydroxy-4-pyrimidyl)hydrazine, M.P.>340° C. with decomposition. There is thus obtained in a similar manner respectively 2:6-dihydroxy-4-p-fluorophenylazopyrimidine which decomposes at 261–263° C., 2:6-dihydroxy-4-p-tolylazopyrimidine which decomposes at 246–247° C., 2:6-dihydroxy-4-m-tolylazopyrimidine which decomposes at 233–234° C. or 2:6-dihydroxy-4-o-tolylazopyrimidine which decomposes at 240° C.

*Example 3*

0.7 part of anhydrous ferric chloride is added to a suspension of 1 part of N-phenyl-N'-(2:6-dihydroxy-4- pyrimidyl)hydrazine in 20 parts of acetic acid. The mixture is stirred at 40° C. for 5 minutes and the orange solution so formed is then poured into 100 parts of water. The mixture is filtered and the solid residue is crystallised from aqueous dimethyl sulphoxide. There is thus obtained 2:6-dihydroxy-4-phenylazopyrimidine, M.P. 243–244° C. with decomposition.

*Example 4*

The process described in Example 3 is repeated except that the 0.7 part of anhydrous ferric chloride used as starting material is replaced by 0.3 part of selenium dioxide. There is thus obtained in a similar manner, 2:6-dihydroxy-4-phenylazopyrimidine, M.P. 243–244° C. with decomposition.

*Example 5*

The process described in Example 3 is repeated except that the 0.7 part of anhydrous ferric chloride used as starting material is replaced by 2 parts of lead tetraacetate. There is thus obtained in a similar manner 2:6-dihydroxy-4-phenylazopyrimidine, M.P. 243–244° C. with decomposition.

*Example 6*

The process described in Example 3 is repeated except that the 0.7 part of anhydrous ferric chloride used as starting material is replaced by 0.5 part of p-benzoquinone. There is thus obtained in a similar manner 2:6-dihydroxy-4-phenylazopyrimidine, M.P. 243–244° C. with decomposition.

*Example 7*

The process described in Example 3 is repeated except that the 0.7 part of anhydrous ferric chloride used as starting material is replaced by 0.5 part of nitrosobenzene. There is thus obtained in a similar manner 2:6-dihydroxy-4-phenylazopyrimidine, M.P. 243–244° C. with decomposition.

*Example 8*

A solution of 0.42 part of sodium nitrite in 6 parts of water is added dropwise during 5 minutes to a stirred suspension of 1 part of N-phenyl-N'-(2:6-dihydroxy-4-pyrimidyl)hydrazine in 20 parts of acetic acid at 18–23° C. After standing for 90 minutes, the reaction mixture is poured into 100 parts of water and the mixture is filtered. The solid residue is crystallised from aqueous dimethylformamide and there is thus obtained 2:6-dihydroxy-4-phenylazopyrimidine, M.P. 243–244° C. with demosposition.

*Example 9*

A solution of 1.96 parts of potassium dichromate in 400 parts of water is added during 5 minutes to a mixture of 4.2 parts of N-phenyl-N'-(2:6-dihydroxy-4-pyrimidyl)-hydrazine, 8 parts of sodium hydroxide and 200 parts of water which is stirred at 18–23° C. in an atmosphere of nitrogen. After being stirred for 15 minutes the pH of the mixture is brought to 5 by the addition of acetic acid. The mixture is filtered and the solid residue is washed with water and with ethanol. It is crystallised from aqueous formic acid and there is thus obtained 2:6-dihydroxy-4-phenylazopyrimidine, M.P. 243–244° C. with decomposition.

*Example 10*

The process described in Example 9 is repeated except that a solution of 3.2 parts of bromine and 2 parts of sodium hydroxide in 60 parts of water is used as starting material instead of the solution of 1.96 parts of potassium dichromate in 400 parts of water. There is thus obtained in a similar manner 2:6-dihydroxy-4-phenylazopyrimidine, M.P. 243–244° C. with decomposition.

*Example 11*

A mixture of 2.18 parts of N-phenyl-N'-(2:6-dihydroxy-4-pyrimidyl)hydrazine, 2.54 parts of finely powdered iodine, 4 parts of sodium hydroxide and 100 parts of water is shaken in an atmosphere of nitrogen for 30 minutes. A small sediment in the mixture is removed by filtration and the filtrate is brought to a pH 5 by the addition of acetic acid. The mixture is filtered and the solid residue is washed with water and with ethanol. It is crystallised from aqueous dimethyl sulphoxide and there is thus obtained 2:6-dihydroxy-4-phenylazopyrimidine, M.P. 243–244° C. with decomposition.

*Example 12*

A copious stream of air is passed through a mixture of 2 parts of N-p-bromophenyl-N'-(2:6-dihydroxy-4-pyrimidyl)hydrazine, M.P. >320° C. with decomposition, 0.05 part of platinic oxide, 10 parts of pyridine, 2 parts of sodium hydroxide and 50 parts of water for 1 hour at 18–23° C. The mixture is filtered and the filtrate is acidified with acetic acid. The mixture is filtered and the solid residue so obtained is 2:6-dihydroxy-4-p-bromophenylazopyrimidine as an orange solid which decomposes above 320° C.

*Example 13*

1 part of powdered iodine is added to a solution of 1 part of N-p-chlorophenyl-N'-(2:6-dihydroxy-4-pyrimidyl)hydrazine in 25 parts of water containing 1 part of sodium hydroxide. The mixture is shaken until all the iodine has dissolved and a red precipitate begins to deposit. The mixture is then acidified with aqueous acetic acid and filtered and the solid residue is washed with water and crystallised from aqueous dimethylformamide. 2:6-dihydroxy-4-p-chlorophenylazopyrimidine is obtained as orange needles which melt at 269–271° C. with decomposition.

The N-p-chlorophenyl-N'-(2:6-dihydroxy-4-pyrimidyl)-hydrazine used as starting material may be obtained as follows: A mixture of 1.46 parts of 4-chloro-2:6-dihydroxypyrimidine, 1.79 parts of p-chlorophenylhydrazine hydrochloride, 5 parts of sodium acetate trihydrate and 80 parts of water is refluxed in an atmosphere of nitrogen for 12 hours and is then cooled. The precipitated solid is collected by filtration and washed with water. There is obtained N-p-chlorophenyl-N'-(2:6-dihydroxy-4-pyrimidyl)-hydrazine as light-brown crystals which darken at 300° C. and decompose above 340° C.

*Example 14*

A solution of 1.27 parts of iodine and 2 parts of potassium iodide in 10 parts of water is added to a solution of 1.43 parts of N-2:4-dichlorophenyl-N'-(2:6-dihydroxy-4-pyrimidyl)hydrazine, M.P. >350° C. with decomposition, 2 parts of sodium hydroxide, 10 parts of pyridine and 50 parts of water. The mixture is stirred in an atmosphere of nitrogen for 15 minutes and is then filtered. 20 parts of acetic acid are added to the filtrate. The mixture is filtered and the solid residue is washed with water and with alcohol. There is thus obtained 2:6-dihydroxy-4-(2:4-dichlorophenylazo)pyrimidine which sinters at 240° C. and decomposes at 260° C.

What I claim is:

1. 2:6-dihydroxypyrimidines of the formula:

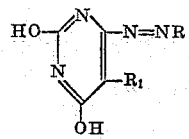

wherein R is selected from the group consisting of phenyl, mono- and di-halophenyl and lower alkylphenyl and $R_1$ is hydrogen.

2. 2:6-dihydroxy-4-phenylazopyrimidine.
3. 2:6-dihydroxy-4-p-bromophenylazopyrimidine.
4. 2:6-dihydroxy-4-chlorophenylazopyrimidine.
5. 2:6 - dihydroxy-4-(2:4 - dichlorophenylazo)pyrimidine.
6. 2:6-dihydroxy-4-p-fluorophenylazopyrimidine.
7. 2:6-dihydroxy-4-tolylazopyrimidine.

References Cited in the file of this patent

UNITED STATES PATENTS

| | | |
|---|---|---|
| 2,426,313 | Ludwig et al. | Aug. 26, 1947 |
| 2,578,290 | Dickey et al. | Dec. 10, 1951 |

OTHER REFERENCES

Lythgal et al.: Jour. Chem. Soc. (London), 1944, pages 315–317.

Polonovski et al.: Bull. Soc. Chim. (France), 1948, pages 688–694.

Degering: An Outline of Organic Nitrogen Compounds, page 386 (1950).